3,033,887
CYCLIC PHOSPHONATES AND METHODS
OF PREPARATION
William S. Wadsworth, Jr., Willow Grove, and William D.
Emmons, Huntingdon Valley, Pa., assignors to Rohm &
Haas Company, Philadelphia, Pa., a corporation of
Delaware
No Drawing. Filed Apr. 22, 1960, Ser. No. 23,896
20 Claims. (Cl. 260—461)

This invention concerns new compositions of matter and their preparation. More particularly, one aspect of the invention relates to new and useful cyclic phosphonates which are substituted in the 1 and the 4 positions of the heterocycylic ring, to their salts, and another aspect of the invention relates to methods of preparing these compounds.

The novel compounds of the invention are characterized by the Formula I

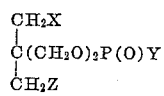

in which X is a halogen atom having an atomic number ranging from 9 to 53 and including fluorine, chlorine, bromine and iodine, Z is (1) an atom of the class VIIA of the periodic chart of the elements having an atomic number of 1 to 53 and including the atoms hydrogen, chlorine, fluorine, bromine and iodine, (2) a hydroxyl group, (3) an alkyl group containing from 1 to 4 carbon atoms, and (4) an acyloxy, RCOO— group in which the alkyl group R contains from 1 to 12 carbon atoms, preferably 1 to 4 carbon atoms;

Y is (1a) an alkyl group containing from 1 to 18 carbon atoms, (1b) an aralkyl group which may be substituted with alkyl groups containing from 1 to 18 carbon atoms or with halogen atoms, preferably the aryl group is phenyl; (2) an alkoxy methyl group in which the alkoxy group contains from 1 to 4 carbon atoms; (3) an alkoxy carbonyl methyl, RO(CO)CH$_2$—, group in which the alkyl group R contains from 1 to 6 carbon atoms; (4) an acylmethyl group in which the acyl group contains from 1 to 6 carbon atoms, and (5) a halogen atom of an atomic weight from 9 to 53.

The cyclic phosphates of the invention are named in accordance with the following nomenclature:

The atoms in the ring are counted starting with the phosphorous atom, followed by one of the oxygen atoms, and then the carbon atoms. The compounds are named phosphonates to indicate that the phosphorous atom is pentavalent. The names of the compounds incorporate the term "propylene" to specify that the compounds incorporate three carbon atoms in the claim. The compounds are disubstituted on the carbon atom in the 4-position of the ring. In the claims, the compounds are named as phosphorinanes. The correspondence between the two types of nomenclature used is illustrated below:

NOMENCLATURE

| In the Specification | In the Claims |
|---|---|
| 4 - chloromethyl - 4 - ethyl - propylene-1-chlorophosphate | 5-chloromethyl-5-ethyl-2-chloro-1,3,2 - dioxaphosphorinane - 2 - oxide |
| 4 - chloromethyl - 4 - ethyl - propylene - 1 - acetoxymethyl - phosphonate | 5 - chloromethyl - 5 - ethyl - 2 - acetoxymethyl - 1, 3, 2 - dioxaphosphorinane-2-oxide |
| 4 - chloromethyl - 4 - ethyl - propylene - 1 - methoxymethyl - phosphonate | 5 - chloromethyl - 5 - ethyl - 2 - methoxymethyl - 1, 3, 2 - dioxaphosphorinane-2-oxide |
| 4 - chloromethyl - 4 - ethyl - propylene - 1 - p - dodecylbenzyl - phosphonate | 5 - chloromethyl - 5 - ethyl - 2 - p - dodecylbenzyl - 1, 3, 2 - dioxaphosphorinane-2-oxide |
| 4 - chloromethyl - 4 - ethyl - propylene-1-carboethoxymethyl-phosphonate | 5 - chloromethyl - 5 - ethyl - 2 - carboethoxymethyl - 1, 3, 2 - dioxaphosphorinane-2-oxide |
| 4,4 - dichloromethylpropylene - 1 - carboethoxymethylphosphonate | 5, 5 - dichloromethyl - 2 - carboethoxymethyl - 1, 3, 2 - dioxaphosphorinane-2-oxide |
| 4 - chloromethyl - 4 - ethyl - propylene-1-benzylphosphonate | 5-chloromethyl - 5 - ethyl - 2 - benzyl-1, 3, 2 - dioxaphosphorinane-2-oxide |

Typical cyclic phosphonates of the invention are the following:

4 - bromomethyl - 4 - methylpropylene 1-n-octadecylphosphonate,
4 - iodomethyl - 4 - methylpropylene 1 - methylphosphonate,
4-iodomethyl-4-methylpropylene 1-butylphosphonate,
4-iodomethyl-4-ethylpropylene 1-methylphosphonate,
4 - chloromethyl - 4 - ethylpropylene 1 - t - butylphosphonate,
4-iodomethyl-4-ethylpropylene 1-ethylphosphonate,
4-chloromethyl-4-methylpropylene 1-ethylphosphonate,
4-bromomethyl-4-ethylpropylene 1-methylphosphonate,
4-chloromethyl-4-ethylpropylene 1-benzylphosphonate,
4-iodomethyl-4-ethylpropylene 1-benzylphosphonate,
4-chloromethyl-4-butylpropylene 1-benzylphosphonate,
4 - chloromethyl-4-ethylpropylene 1 - methylbenzylphosphonate,
4 - chloromethyl - 4 - ethylpropylene 1-chlorobenzylphosphonate,
4 - chloromethyl - 4 - ethylpropylene 1-dodecylmethylbenzylphosphonate,
4-iodomethyl-4-hydroxymethylpropylene 1 - methylphosphonate,
4 - chloromethyl-4-ethylpropylene 1-methoxymethylphosphonate,
4 - chloromethyl-4-ethylpropylene 1 - butoxymethylphosphonate,
4 - iodomethyl - 4 - methylpropylene 1-ethoxymethylphosphonate,
4,4-dichloromethylpropylene 1-benzylphosphonate,
4,4 - dichloromethylpropylene 1 - dichlorobenzylphosphonate,
4,4-dichloromethylpropylene 1-butylbenzylphosphonate,
4-chloromethyl-4-ethylpropylene 1-chlorophosphate,
4 - chloromethyl - 4 - hydroxymethylpropylene 1 - chlorophosphate,
4 - chloromethyl - 4 - ethylpropylene 1 - acetoxymethylphosphate,
4 - chloromethyl - 4 - ethylpropylene 1 - acetylmethylphosphonate,
4 - chloromethyl - 4 - methylpropylene 1 - propionylmethylphosphonate, 4 - iodomethyl - 4 - methylpropylene 1 - hexanoylmethylphosphonate,
4 - chloromethyl - 4 - ethylpropylene 1-carbethoxymethylphosphonate,
4-iodomethyl - 4 - methylpropylene-1-carbobutoxymethylphosphonate,
4-bromomethyl - 4 - ethylpropylene 1-carboethoxymethylphosphonate,
4,4 - dichloromethylpropylene 1 - carboethoxymethylphosphonate,
4 - chloromethyl - 4 - acetoxymethylpropylene 1 - methylphosphonate,
4 - chloromethyl - 4 - dodecanoxymethylpropylene 1-methylphosphonate,
4 - chloromethyl - 4 - isobutyroxymethylpropylene 1-methylphosphonate, and
4-chloromethyl - 4 - hexanoxymethylpropylene 1-chlorophosphate.

The cyclic phosphonates of the invention are prepared by a method which comprises reacting a bicyclic phosphite with a halogen providing compound YX, X and Y being defined in Formula I. An unusual aspect of the method is that instead of splitting out the the halogen atom from the YX compound, it is retained in the resulting cyclic phosphonate molecule, thus enhancing its useful properties. Another unique aspect is that, of the two isomeric forms which can be assumed by the cyclic phosphonates which have dissimilar groups bonded onto the 4-position of the ring, it is cis compound which is produced exclusively, that one generally being the most active of the two isomeric forms with respect to their pesticidal activity.

In accordance with the method of the invention, the cyclic phosphonates are prepared from bicyclic phosphites of the following general formula $$ZCH_2C(CH_2O)_3P \qquad (II)$$

in which Z has the definition given above.

Typical starting bicyclic phosphites are methyl bicyclic phosphite, butyl bicyclic phosphite, and ethyl bicyclic phosphite; hydroxymethyl bicyclic phosphite, chloromethyl bicyclic phosphite, iodomethyl bicyclic phosphite, bromomethyl bicyclic phosphite, fluoromethyl bicyclic phosphite, chloroethyl bicyclic phosphite, and chlorobutyl bicyclic phosphite, acetoxymethyl bicyclic phosphite, butyroxymethyl bicyclic phosphite, isobutyroxymethyl bicyclic phosphite, octanoxymethyl bicyclic phosphite, duodecanoylmethyl bicyclic phosphite, and the like.

These bicyclic phosphites may be prepared by a number of suitable methods, such as by the procedure described in Journal of American Chemical Society 78, page 6413 (1956), by Hoffmann, Moore, and Kogan, as suitably modified to suit the instant situation. A method well adapted to prepare the bicyclic phosphite is the reaction of equimolar amounts of triethylphosphite with pentaerythritol with gradual removal of the alcohol under moderate heating, such as in the range of 85° to 180° C. Another method for preparing the bicyclic phosphite is by reacting phosphorous trichloride with a trimethylol alkane at reduced temperatures, such as from 0° to 80° C., under a stream of nitrogen for the removal of the hydrogen chloride. Other known methods may be employed in the preparation of the bicyclic phosphites that are employed as starting materials in accordance with the invention.

In addition to their usefulness as starting compounds for the preparation of the cyclic phosphonates of the invention, the bicyclic phosphites are useful for preparing the corresponding bicyclic phosphates. These may be assigned the formula $$ZCH_2C(CH_2O)_3P(O)$$

in which Z has the definition given in Formula I. The bicyclic phosphates are obtainable from the corresponding phosphites by oxidation of the phosphite with peroxides, such as hydrogen peroxide, di-t-butylperoxide, benzoyl peroxide; acid peroxides like acetyl peroxide; hydroperoxides or equivalent oxidizing compounds, or alternatively from the reaction of a trimethylol alkane with a phosphorous oxyhalide, preferably the bromide or chloride.

The bicyclic phosphates are active pesticides, especially effective insecticides. The bicyclic phosphates in which Z is an alkyl group containing 1 to 4 carbon atoms, and in particular ethyl bicyclic phosphate, are especially useful in the control of flies, mites, aphids, spiders, mosquitoes, army worms, weavils, and the like. The bicyclic phosphates may be used as contact, stomach or as systemic insecticides. They may be extended with a carrier or diluent before application to plants; they may be used in the form of dusts, wettable powders, or emulsifiable concentrates. Dusts may contain from 1 to 10% of a phosphate, which is dispersed in or coated on a finely divided solid, such as talc, clay, silica, calcium or magnesium carbonate, or other finely divided inert solid or mixtures thereof. A dispersing agent, such as a condensed naphthalene-formaldehyde sodium sulfonate or a lignin sulfonate, may be added.

Wettable powders may be similarly prepared except that the proportion of phosphate is made high and usually a wetting agent is added. Wettable powders may also be prepared by milling phosphate and solid carrier together. Wettable powders usually contain 20% to 30 % of phosphate, 1 to 2% of a dispersing agent, and 1% to 4% of a wetting agent, such as an alkylphenoxypolyethoxyethanol or other non-ionic agent, a sodium alkylbenzenesulfonate, sodium lauryl sulfate and comparable sodium alkyl sulfates and sulfonates, octylphenoxyethoxyethoxyethyl sodium sulfonate, and the like.

The phosphate may also be used for solutions in organic solvents; solutions in an inert organic solvent, such as toluene, xylene, or an aromatic naphtha are treated with an oil-soluble emulsifying agent, such as an octylphenoxypolyethoxyethanol or such agent plus calcium dodecylbenzenesulfonate. The solution may contain 10 to 25% of the toxicant and 2 to 6% of emulsifier. When this composition is extended with water, it provides a spray in which the toxicant is well dispersed. Also, the phosphates may be used as their aqueous solutions, with or without an emulsifier such as those described above.

A typical formulation may be prepared by mixing 25 parts of ethyl bicyclic phosphate and 66 parts of clay and adding thereto three parts of octylphenoxypolyethoxyethanol on five parts of magnesium carbonate and 1 part of sodium naphthalene-formaldehyde sulfonate.

The method for preparing the cyclic phosphonates of the invention from the above-discussed bicyclic phosphites comprises reacting, by bringing together, the bicyclic phosphites of Formula II with a halogen yielding compound YX, in which X and Y are as defined in Formula I.

The compounds which YX represent may be alkyl halides in which the alkyl group contains from 1 to 18 carbon atoms and aralkyl halides in which the aryl group contains six carbon atoms. Typical halides are methyl bromide, methyl iodide, ethyl iodide, and propyl bromide, amyl bromide, n-hexyl bromide, n-octadecyl bromide, benzyl chloride, benzyl iodide, and the like. When high reactivity is desired, primary alkyl halides, in particular the methyl halides and the benzyl halides, are preferred. Accordingly, by taking into account the differences in reactivity stated above, the individual reactivity of the starting bicyclic phosphite and the differences between the iodides, the bromides and the chlorides, suitable control of the reaction is obtained. For best results, X should be methyl and Y bromine or iodine when, in Formula I, Z is a hydroxyl group.

Another group of reactants represented by YX are chlorinated acetic acid esters, which may be represented by the formula

RO(CO)CHX— in which the group R contains 1 to 6 carbon atoms.

Typical of such esters are butyl 2-chloroethanoate, methylchloroethanoate, methylbromoethanoate, ethylchloroethanoate, ethylbromoethanoate, hexylbromoethanoate, and the like. Further useful reactants represented by YX are haloalkoxymethane ethers, ROCH$_2$X, in which the alkyl group R preferably contains 1 to 4 carbon atoms, and which are typified by chloromethyl ether, chloroethoxymethane, bromoethoxymethane, iodoethoxymethane, and the like. Another group of useful reactants includes acylhalomethyl compounds, RCOCH$_2$X in which the R and the X groups have the same definition as those given in the alkyl halides defined above. Typical of such reactants are chloroacetone, 1-chloro-2-butanone, 1-chloro-2-pentanone, 1-chloro-2-nonanone, 1 - bromo-2-pentanone, 1-iodo-2-butanone, bromoacetone, iodoacetone, phenacyl chloride, phenacyl bromide, and their equivalents; also, YX may be a halogen gas.

In accordance with the process of this invention, the reactants are generally used in stoichiometric amounts, though an excess of the YX reactant is not detrimental. Preferably, the temperature of the reaction is maintained in the range of 100° to 210° C., especially from 100° to 180° C., the optimum temperature being readily determined to suit best the individual reactivity of the ester, halide, ether, and ketones represented by YX. As the product is formed, it precipitates out when it is a solid, in which event it may be separated from the liquid reaction mixture by suitable procedures; when the product is liquid, excess solvent may be stripped off, and the product is obtained by suitable methods, such as by distillation under reduced pressure. Purer products are obtainable, for instance, by consecutive crystallization from a suitable solvent.

In the embodiment of the invention in which X and Y or X, Y, and Z equal a halogen, the preferred method of preparation comprises providing a gaseous source of a halogen, like bromine, chlorine, or fluorine. The gas is reacted with the bicyclic phosphite, preferably dissolved in an inert organic solvent which is stable to ionic halogenation. Typical solvents include aromatic hydrocarbons, such as benzene, toluene, xylene; chlorinated hydrocarbons, such as monochlorobenzene and dichlorobenzene; nitroaromatic hydrocarbons, such as nitrobenzene, o-, m-, or p-dinitrobenzene, o-nitrotoluene, 2,4,6-trinitro-m-xylene; chlorinated aliphatic hydrocarbons, such as chloroform, carbon tetrachloride, methylene chloride, ethylene dichloride, and tetrachloroethane, methylene chloride, ethylene dichloride, and ethers, such as dimethyl ether, dioxane or dimethoxyethane. For complete reaction, at least two moles of halogen gas are fed to the bicyclic phosphite solution. Since the reaction is exothermic, it may vary over a wide range from the point at which the reaction speed is negligible, as about −50° C. or even lower, to the upper temperature limit which is commensurate with safety considerations, as about 70° C.; for practical and efficient reaction the overall temperature range may be −20° to 50° C. and especially from −10° to 30° C. The reaction is substantially terminated when no further uptake of gas is observed. By stripping off the solvent, there are obtained the compounds of the invention in which X, Y or X, Y and Z are halogen. These compounds are unusual in combining good fungicidal activity with herbicidal effectiveness.

A typical preparation of a cyclic phosphate, in which X and Y are halogen atoms, is that of 4-chloromethyl-4-ethylpropylene 1-chlorophosphate. This chlorophosphate is obtained by dissolving two tenth mole (32.4 parts) of ethyl bicyclic phosphite in 500 parts of anhydrous ether. The solution is cooled to −20° C. by means of a Dry Ice-acetone bath. Chlorine gas is bubbled through the solution yielding a voluminous precipitate. Additional gas is fed until the solution assumes a characteristic green color of chlorine gas; the gas input is then discontinued and the solution is allowed to come slowly to room temperature. At that time, the solution is completely clear and homogeneous and upon stripping of the ether, the liquid product is obtained in an 87% yield. It has a boiling point of 135° C. at 0.3 mm. and an $n_D^{18}$ of 1.4876.

Another typical preparation is that of 4-iodomethyl-4-ethylpropylene - 1 - methylphosphonate. This phosphonate is obtained by heating together one tenth mole (16.2 parts) of methyl bicyclic phosphite and one tenth mole (14.1 parts) of methyliodide with stirring at 120° C. for two hours. Upon cooling and addition of a large excess of ether, a crystalline mass comes out of the solution. This product is separated from the liquid fraction by filtration and then washed with ether. The phosphonate is recrystallized twice with ethyl acetate; it is obtained in 85% yield and has a melting point of 102° to 103° C.

The salts of the compounds of the invention are prepared by contacting the cyclic phosphonates with an aqueous medium providing a source of hydroxyl ions and an ionizable strongly basic compound. The basic compound is preferably used in a stoichiometric amount and the salt can be isolated in quantitative yields. Since the reaction is exothermic, no external heat need be applied; to favor high yields, it is preferable to maintain the temperature below 40° C., by suitable cooling methods. The salt product is water-soluble; stripping of its solution gives a product which may be further purified by repeated crystallization from suitable solvents.

Suitable bases for the preparation of the salts of the cyclic phosphonates are those which, in a 0.1 N concentration in water, give a pH of at least 8.0, at 25° C. The strong base used is one which preferably ionizes alomst completely in water to provide hydroxyl ions.

Typical strong bases that may be employed are the alkali metals and the alkaline earth metals, the hydroxides, oxides, alkoxides, the quaternary hydroxides, the quaternary alkoxides, and the amides thereof. Typical thereof are sodium hydroxide, sodium carbonate, calcium hydroxide, trimethylbenzyl ammonium hydroxide, and the like. Cation exchange resins containing quaternary ammonium hydroxide groups may also be employed.

The cyclic phosphonates that are obtained in the cis form are isomerized to the trans form by treating the cis form with an aqueous medium providing an ionizable acidic compound typified by strong inorganic or organic acids or acid salts and equivalent acidic materials. In a broad manner, acidic materials that have a dissociation constant of at least $1 \times 10^{-2}$ in water, at 25° C., are suitable for the conversion of the cis to the trans form. Typical acids include strong mineral acids and strong organic acids, such as sulfuric, phosphoric, hydrochloric, nitric, butyric; acid-forming salts, such as sodium acid sulfate, zinc chloride; organic sulfonic acids, such as toluene sulfonic acid and methane sulfonic acids; strong carboxylic acids, such as maleic and oxalic acids, and their equivalent. To promote the conversion to the trans form, heat may be applied to within a range of 70° to 100° C. The trans form is then obtained as crystals that come out of the solution.

Cyclic phosphonates of this invention have a wide variety of valuable utilities. Also they undergo a number of useful chemical reactions. Furthermore, they are useful as pesticides, particularly as fungicides, herbicides, and insecticides.

In combatting pests, they may be used as dusts, wettable powders, self-dispersible concentrates, in solution or suspension. Compositions suitable as dusts are prepared from one or more cyclic phosphonates of this invention dispersed in a solid carrier, such as talc or clays. The compound may be used in an amount ranging from ½% to 25%. As wettable powders, the cyclic phosphonates, in a range of about 20% to 90%, are mixed with about 1 to 5% of a suitable wetting agent, such as a water-soluble, surface-active polyethoxyalkylphenoxypolyethoxyethanol and about 0.5% to 3% of a suitable dispersing agent, such as a formaldehyde condensed naphthalene-sulfonate. The wettable powder may then be suspended in an aqueous medium and applied as a spray. Also, the cyclic phosphonates of the invention may be formulated into self-emulsifiable or self-dispersible concentrates or aqueous sprays. Since the salts of the cyclic phosphonates of the invention are water-soluble and possess good herbicidal and fungicidal properties, they offer a particularly suitable group where aqueous applications are desired.

The cyclic phosphonate of the invention may be employed as herbicides in pre-immergence or post-immergence applications. Generally, since the post-immergence applications offer somewhat preferred control, they are recommended.

The cyclic phosphonates of the invention are useful in controlling typical monocotyledons, such as duckweed, pondweed, undesirable grasses and herbs and dicotyledons typified by broad leaf plant species, such as curley dock and velvet leaf. In fungicidal tests, the cyclic phosphonates of the invention were found to be effective in the control of fungi as determined in standard tests against *Phytophthora infestans*, the late blight of tomato.

In testing the herbicidal properties of the cyclic phosphonates of the invention against millet and wild oat (monocot.) and against curely dock and velvet leaf (dicot.), it was observed that the class of compounds typified by 4,4-dichloro-1-chlorophosphate combine good herbicidal and fungicidal activity, whereas those compounds typified by 4-chloromethyl-4-ethylpropylene1-benzylphosphonate specially lend themselves for fungicidal applications. In comparative tests between the two isomeric forms of 4-chloromethyl-4-ethylpropylene-1-benzyl phosphonate, the cis form was found to be more effective than the trans form in fungicidal and herbicidal applications. For aqueous applications where solubility in water was desired, the salts derived from the cyclic phosphonates, such as the sodium salt of 2-chloromethyl-2 - hydroxymethylpropylbenzylphosphonate, offer the best suited class of compounds.

The following examples, in which all parts are by weight unless otherwise indicated, are offered as illustrative of the method of the invention and are not intended to be construed as a limitation thereon.

*Example 1*

4-bromomethyl - 4-ethylpropylene-1-carboethoxymethyl phosphonate is prepared by heating together 16.2 parts of ethyl bicyclic phosphite and ethylbromoacetate with stirring for four hours at 180° C. The viscous solution is distilled at 196° to 197° C. at 0.25 mm. and the distillate, upon cooling, gives the crystalline product. Upon recrystallization from ether, there is obtained the cyclic phosphonate having a melting point of 47° to 50° C.

4 - chloroethyl-4-methylpropylene-1-carboethoxymethyl phosphonate is obtained, in a similar fashion, from methyl bicyclic phosphite and methylchloroethanoate. 4-bromomethyl - 4 - methylpropylene - 1 - carbomethoxymethyl phosphonate is obtained from the reaction of methyl bicyclic phosphite and methylbromoethanoate. Butyl bicyclic phosphite and ethylchloroethanoate yield 4-bromomethyl-4-butylpropylene - 1 - carboethoxymethyl phosphonate.

*Example 2*

4-iodomethyl-4-ethylpropylene - 1 - methyl phosphonate is obtained by reacting 16.2 parts of ethyl bicyclic phosphite with 14.1 parts of methyl iodide by heating together and stirring at 120° C. for two hours. The solution is then cooled and to it there is added a large excess of ether. This brings about the formation of a large crystalline mass, which is filtered by suction and washed well with ether. The product is recrystallized twice with ethylacetate to give an 85% yield of 4-iodomethyl-4-ethylpropylene-1-methyl phosphonate having a melting point of 102° to 103° C.

Likewise, the reaction of methyl bromide with ethyl bicyclic phosphite yields, in a similar fashion, 4-bromomethyl-4-ethylpropylene-1-methylphosphonate.

*Example 3*

4 - chloromethyl-4-ethylpropylene-1-benzylphosphonate is obtained by reacting 16.2 parts of ethyl bicyclic phosphite and 12.65 parts of benzyl chloride by heating at 170° C. for twelve hours with stirring. Upon cooling the solution and addition of excess ether, a crystalline precipitate is separated. Upon recrystallization from carbon tetrachloride, a 91% yield of this cyclic phosphonate is obtained which has a melting point of 117° to 118° C.

Likewise, 11.01 parts of benzyl fluoride are reacted with methyl bicyclic phosphite to yield 4-fluoromethyl-4-methylpropylene-1-benzyl phosphonate. Also, 21.8 parts of benzyliodide react with 17.6 parts of ethyl bicyclic phosphite to give, after heating at 120° C., 4-iodomethyl-4-ethylpropylene-1-benzyl phosphonate.

In a similar manner, 4-bromomethyl-4-ethylpropylene-1-octadecyl phosphonate is obtained by reacting 33.34 parts of n-octadecylbromide with 16.2 parts of ethyl bicyclic phosphite. Ethyliodide reacts with methyl bicyclic phosphite to give 4 - iodomethyl - 4 - methylpropylene-1-ethylphosphonate.

*Example 4*

The sodium salt derived from 4-iodomethyl-4-ethyl propylene-1-methyl phosphonate is obtained by treating 6.8 parts of 4-iodomethyl-4-ethylpropylene-1-methyl phosphonate with 8 parts of a 10% sodium hydroxide solution. The exotherm was controlled by cooling and the phosphonate became gradually water-soluble. The solution was stripped at reduced pressure giving a colorless material which, upon addition of ethyl acetate, gives a crystalline product. This product is recrystallized twice from n-butanol to yield the salt having a melting point of 170° to 172° C. It is a useful compound in herbicidal and fungicidal compositions, which could be readily applied in aqueous solutions.

Likewise, the sodium salts of 4-bromomethyl-4-butylpropylene - 1 - carboethoxymethyl phosphonate, 4-bromomethyl-4-ethylpropylene-1-methyl phosphonate, 4-fluoromethyl-4-ethylpropylene-1-benzyl phosphonate, are obtained by the addition of a 10% aqueous sodium hydroxide solution. Similarly, lithium hydroxide solutions give the lithium salts and the potassium salts are obtained from potassium hydroxide solutions.

*Example 5*

4-iodomethyl - 4 - hydroxymethylpropylene - 1 - methyl phosphonate is obtained by heating 26.24 parts of hydroxymethyl bicyclic phosphate with 14.1 parts of methyliodide for two hours with stirring. Upon cooling and addition of an excess of ether, a crystalline product comes out of the solution which, after crystallization and filtration from acetone, gives a final yield of 67% product having a melting point of 134° to 135° C.

*Example 6*

The trans-4-chloromethyl-4-ethylpropylenebenzyl phosphonate is obtained from 10 parts of the corresponding cis-phosphonate by refluxing it for 24 hours with 40 parts of concentrated hydrochloric acid. Water is stripped from the homogeneous solution leaving a product which is distilled at 182° to 184° C. at 0.25 mm. and then crystallizes on standing. The crystalline product has a melting point of 92° to 94° C. and the infrared spectrum of the compound proves it to be the transform of this benzyl phosphonate. In fungicidal tests, the cis form is shown to be more active than the trans form.

*Example 7*

4-chloro-4-ethylpropylene-1-acetylmethyl phosphonate is obtained by reacting 9.25 parts of chloroacetone with 16.2 parts of ethyl bicyclic phosphite for 5 hours at 150°

C. Upon cooling, a product is obtained which is distilled at 180° to 185° C. under 0.5 mm. pressure. The product crystallizes on standing to give this phosphonate having a 98° C. melting point.

Likewise, 4-chloro-4-ethylpropylene-1-buteroxymethyl phosphonate results from the reaction of ethyl bicyclic phosphite and 1-chloro-2-pentanone. In a similar manner, phenacyl chloride is reacted with ethyl bicyclic phosphite to give 4-chloro-4-ethylpropylene-1-phenacyl phosphonate.

*Example 8*

4,4-bis-chloromethylpropylene-1-chlorophosphate is obtained by dissolving 9.1 parts of chloromethyl bicyclic phosphite in 100 parts of methylene chloride. Chlorine gas is bubbled through the solution at −10° C.; a voluminous precipitate results. Input of gas is discontinued when excess gas comes off. Upon gradual warming up to room temperature, the solution becomes clear. Stripping of solvent leaves a crystalline residue, which is recrystallized from carbon tetrachloride and is obtained in 82% yield and has a melting point of 85° to 87° C.

*Example 9*

41.2 parts of acetoxymethyl bicyclic phosphite is heated in a reaction flask with 25.2 parts of benzyl chloride at a temperature from 160° to 170° C. with stirring. At the end of the reaction, the reactants are cooled and the precipitate that comes out is separated. Upon recrystallization from carbon tetrachloride, there is obtained 4-chloromethyl-4-acetoxymethyl-1-benzyl phosphonate.

Likewise, hexanoxymethyl bicyclic phosphite yields, upon reaction with benzyl chloride, 4-chloromethyl-4-hexanoxymethyl-1-benzyl phosphonate.

We claim:
1. A cyclic phosphonate of the formula

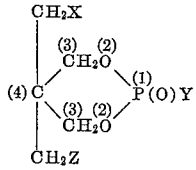

in which X is a halogen atom having an atomic number ranging from 9 to 53,
   Y is selected from the group consisting of (1a) an alkyl group containing from 1 to 18 carbon atoms, (1b) an aralkyl group in which the aryl group is phenyl, (2) an alkoxymethyl group in which the alkoxy group contains from 1 to 4 carbon atoms, (3) an alkoxy carbonyl methyl, $RO(CO)CH_2$—, group in which the alkyl group R contains from 1 to 6 carbon atoms; (4) an acylmethyl group in which the acyl group contains from 1 to 6 carbon atoms, and (5) a halogen atom having an atomic number ranging from 9 to 53;
   Z is selected from the group consisting of (1) a hydrogen atom, (2) an hydroxyl group, (3) an alkyl group containing from 1 to 4 carbon atoms, (4) an acyloxy, RCOO— group in which the alkyl group R contains from 1 to 12 carbon atoms, and (5) a halogen atom having an atomic number ranging from 9 to 53; and the alkali metal and alkaline earth metal salts of these cyclic phosphonates.
2. The cyclic phosphonate of the formula

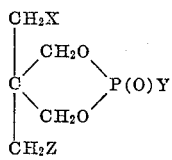

in which X is a halogen atom having an atomic number of 1 to 53;
   Y is a halogen atom having an atomic number of 1 to 53; and
   Z is an alkyl group containing from 1 to 4 carbon atoms.
3. The cyclic phosphonates of the formula

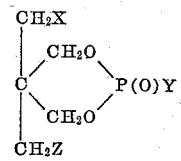

in which X is a halogen atom having an atomic number ranging from 9 to 53,
   Y is an alkoxymethyl group in which the alkoxy group contains from 1 to 4 carbon atoms, and
   Z is an alkyl group containing from 1 to 4 carbon atoms.
4. The cyclic phosphonates of the formula

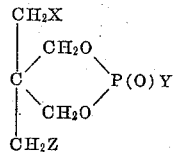

in which X is a halogen atom having an atomic number ranging from 9 to 53,
   Y is a benzyl group, and
   Z is an alkyl group containing from 1 to 4 carbon atoms.
5. The cyclic phosphonate of the formula

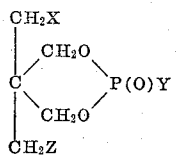

in which X is a halogen atom having an atomic number ranging from 9 to 53,
   Y is an alkyl group containing from 1 to 18 carbon atoms, and
   Z is an alkyl group containing from 1 to 4 carbon atoms.
6. The cyclic phosphonates of the formula

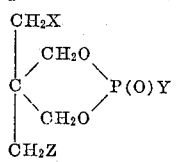

in which X is a halogen atom having an atomic number ranging from 9 to 53,
   Y is an alkoxy carbonyl methyl, $RO(CO)CH_2$—, group in which the alkyl group R contains from 1 to 6 carbon atoms, and
   Z is a halogen atom having an atomic number ranging from 9 to 53.
7. The cyclic phosphonate of the formula

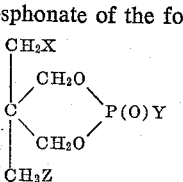

in which X is a halogen atom having an atomic number ranging from 9 to 53,
   Y is an alkoxy carbonyl methyl, $RO(CO)CH_2$—, group in which the alkyl group R contains from 1 to 6 carbon atoms, and
   Z is an alkyl group containing from 1 to 4 carbon atoms.
8. 5 - chloromethyl - 5 - ethyl - 2 - chloro - 1,3,2 - dioxaphosphorinane-2-oxide.

9. 5 - chloromethyl - 5 - ethyl - 2 - acetoxymethyl - 1,3,2-dioxaphosphorinane-2-oxide.

10. 5 - chloromethyl - 5 - ethyl - 2 - methoxymethyl-1,3,2-dioxaphosphorinane-2-oxide.

11. 5 - chloromethyl - 5 - ethyl - 2 - p - dodecylbenzyl-1,3,2-dioxaphosphorinane-2-oxide.

12. 5 - chloromethyl - 5 - ethyl - 2 carboethoxymethyl-1,3,2,-dioxaphosphorinane-2-oxide.

13. 5,5 - dichloromethyl - 2 - carboethoxymethyl - 1,3,2-dioxaphosphorinane-2-oxide.

14. 5 - chloromethyl - 5 - ethyl - 2 - benzyl - 1,3,2, - dioxaphosphorinane-2-oxide.

15. A process for the preparation of cyclic phosphonates of the formula

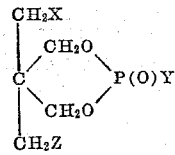

which comprises contacting a bicyclic phosphite of the formula $$ZCH_2C(CH_2O)_3P$$

in which Z is selected from the group consisting of (1) a hydrogen atom, (2) an hydroxyl group, (3) an alkyl group containing from 1 to 4 carbon atoms, (4) an acyloxy, RCOO— group in which the alkyl group R contains from 1 to 12 carbon atoms, and (5) a halogen atom having an atomic number ranging from 9 to 53, with a halogen yielding reactant of the formula

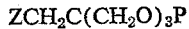

in which Y is selected from the group consisting of (1) an atom of gaseous halogen, (2) an alkyl group containing 1 to 18 carbon atoms, (3) an aralkyl group in which the aryl group is benzyl and the alkyl group contains 1 to 18 carbon atoms, (4) an $ROCH_2$ group in which R is an alkyl group containing 1 to 4 carbon atoms, and (5) an $RCOCH_2$ group in which R is selected from the group consisting of an alkyl group containing from 1 to 6 carbon atoms and phenyl; and X is an atom of a gaseous halogen when Y is (1) and X being a halogen atom of an atomic number ranging from 9 to 53 in all other occurrences;

with the proviso that when Z is a hydroxyl group, Y is methyl and X is a halogen atom of an atomic number of 35 to 53; it being further provided that when Y is (1) the reaction is carried out in the presence of an inert organic solvent stable to ionic halogenation and that when Y represents the groups defined under (2) to (5) the reaction is carried out at a temperature not exceeding 210° C.

16. The process of claim 15 in which the reaction temperature is in the range of 100° to 200° C.

17. The process of claim 15 in which the reactant XY is selected from the group consisting of chloromethyl ether, chloroacetone and ethylbromoacetate.

18. The process of claim 15 in which in the reactant XY, X is a halogen atom of an atomic number of 35 to 53 and Y is methyl.

19. A process for the preparation of cyclic phosphonates of the formula of claim 15 in which X and Y are each an atom of a halogen of an atomic number of 35 to 53 and Z is selected from the group consisting of (1) a hydrogen atom, (2) an hydroxyl group, (3) an alkyl group containing from 1 to 4 carbon atoms, (4) an acyloxy, RCOO— group in which the alkyl group R contains from 1 to 12 carbon atoms, and (5) a halogen atom having an atomic number ranging from 9 to 53, which comprises contacting a bicyclic phosphite of the formula of claim 15 in an inert organic solvent stable to ionic halogenation with at least two moles of a halogen gas at a temperature not exceeding 50° C.

20. A process for the preparation of the alkali metals and the alkaline earth metal salts of the cyclic phosphonates of claim 15 which comprises contacting a cyclic phosphonate of claim 15 with an aqueous base of a metal selected from the group consisting of alkali metals and alkaline earth metals.

References Cited in the file of this patent

UNITED STATES PATENTS 2,834,798    Hechenbleikner et al. ____ May 13, 1958

OTHER REFERENCES

Chemical Abstracts, 5th Decennial Index, page 4229S, top of column 3.